(12) United States Patent
Ho et al.

(10) Patent No.: US 7,574,125 B2
(45) Date of Patent: Aug. 11, 2009

(54) TWO-STAGE LENS DRIVING DEVICE

(75) Inventors: Wen Jen Ho, Shalu Township, Taichung County (TW); Chi Lone Chang, Jhudong Township, Hsinchu County (TW); Hsin Cheng Yang, Hsinchu (TW); Heng I Yu, Taichung (TW)

(73) Assignee: PowerGate Optical Inc., Hsinchu County (TW)

( * ) Notice: Subject to any disclaimer, the term of this patent is extended or adjusted under 35 U.S.C. 154(b) by 412 days.

(21) Appl. No.: 11/494,535

(22) Filed: Jul. 28, 2006

(65) Prior Publication Data
US 2007/0223903 A1   Sep. 27, 2007

(30) Foreign Application Priority Data
Mar. 21, 2006   (TW) .............................. 95109722 A

(51) Int. Cl.
*G03B 17/00* (2006.01)
(52) U.S. Cl. .......................... 396/85; 396/133; 359/694
(58) Field of Classification Search .................. 396/85, 396/133; 359/694, 696
See application file for complete search history.

(56) References Cited

U.S. PATENT DOCUMENTS

| | | | | |
|---|---|---|---|---|
| 5,014,077 A | * | 5/1991 | Yomogizawa et al. | 396/349 |
| 6,312,168 B1 | * | 11/2001 | Naruse et al. | 396/349 |
| 2004/0174614 A1 | * | 9/2004 | Hovanky | 359/694 |
| 2006/0028320 A1 | * | 2/2006 | Osaka | 340/384.1 |
| 2007/0053073 A1 | * | 3/2007 | Hsiao et al. | 359/696 |

* cited by examiner

Primary Examiner—W.B. Perkey
Assistant Examiner—Warren K Fenwick
(74) Attorney, Agent, or Firm—Troxell Law Office PLLC

(57) ABSTRACT

A two-stage lens driving device includes a lens holder, a guiding mechanism, and an electromagnetic actuating mechanism. The guiding mechanism is joined with the lens holder for guiding the lens holder moving along an axial direction. The electromagnetic actuating mechanism includes a magnetic induction member, a first coil member, and a second coil member. The magnetic induction member is mounted on and movable with the lens holder. The first and second coil members are respectively located at two tail ends of the magnetic induction member. The first coil member, the magnetic induction member, and the second coil member are arranged linearly parallel to the axial direction. A distance between the coil members is greater than a length of the magnetic induction member along the linear direction. By applying current to one of the coil members, the magnetic induction member is driven to move between the first and the second coil members.

19 Claims, 9 Drawing Sheets

A-A section

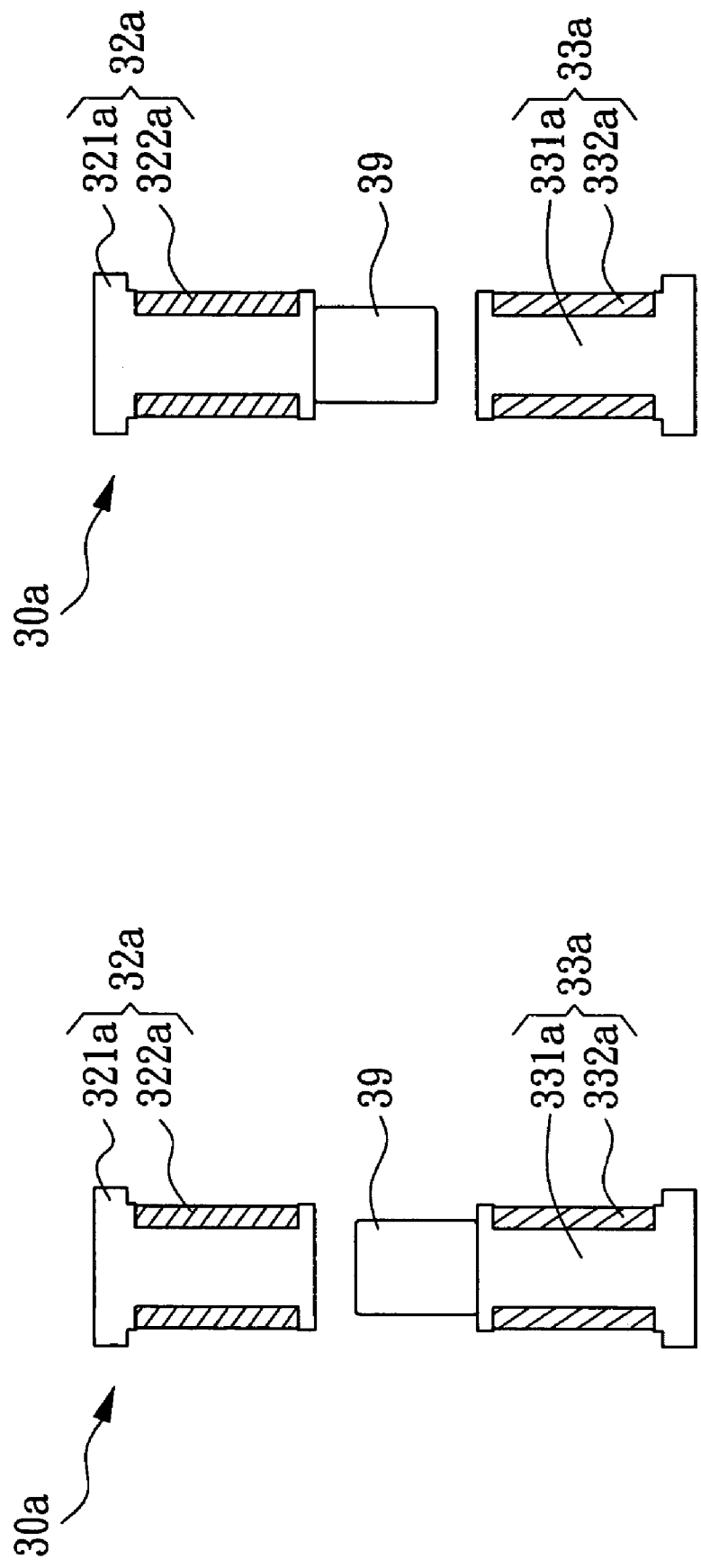

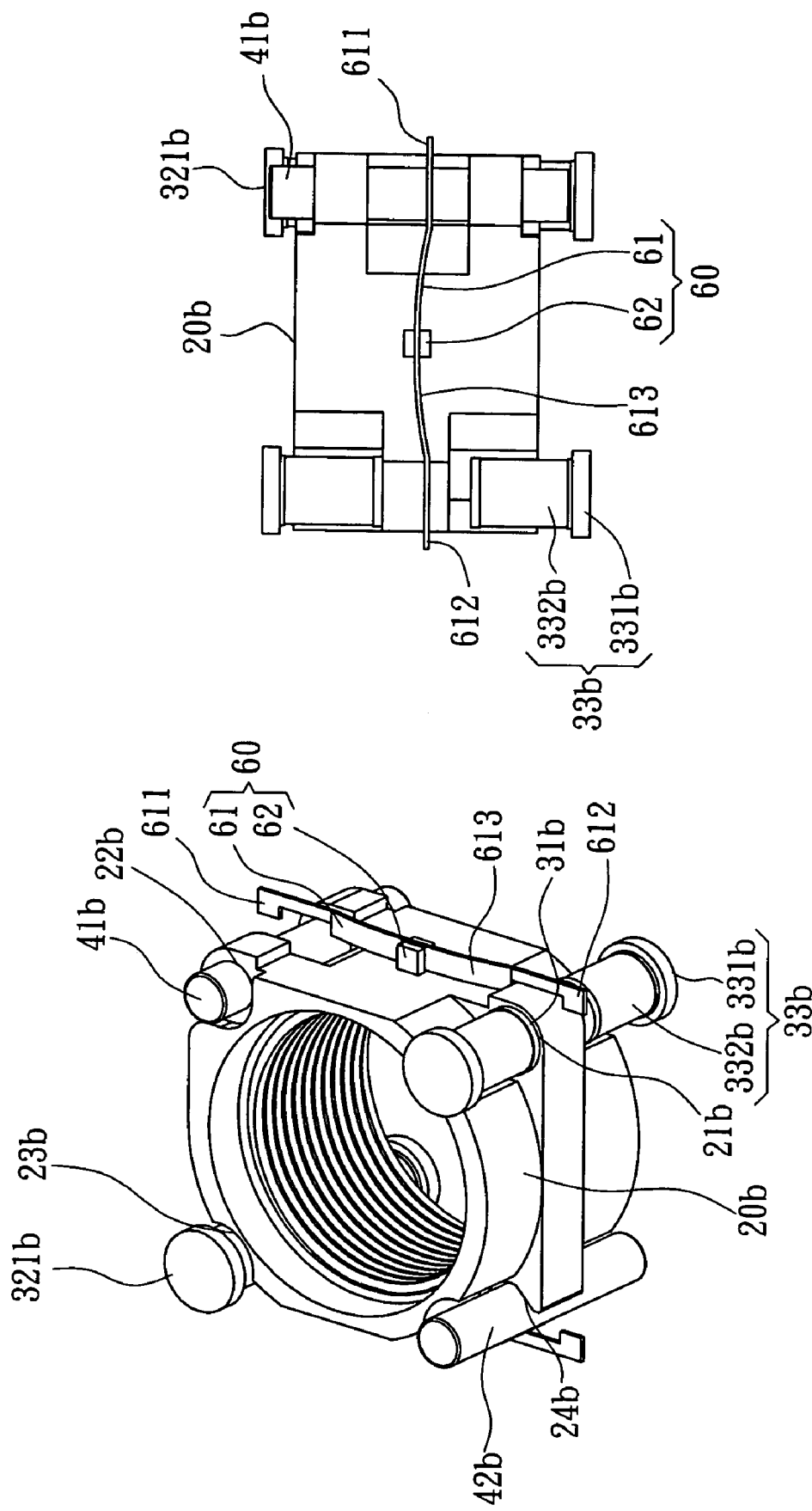

ive device, the present invention is unlike these prior art
TWO-STAGE LENS DRIVING DEVICE

BACKGROUND OF INVENTION

1. Field of the Invention

The present invention is related to a two-stage lens driving device, in particular to a lens driving device that uses an electromagnetic driving device as a power source to drive a lens holder so as to undergo switching between two positions.

2. Description of the Prior Art

Referring to FIG. 1, a general photo device 1 mainly comprises a lens set 11 and a sensitive member 12, wherein the lens set 11 provides the image of an object to the sensitive member 12. If a distance between the lens set 11 and the sensitive member 12 is fixed (fixed focus lens), the photo device 1 can only take a clear image of an object with 2-3 meters of a hyperfocal distance. In order to shoot in a little distance, a separate lens driving device (not shown) can be used to drive the lens set 11 to change the distance between the lens set 11 and the sensitive member 12 for focusing.

If the lens set 11 has a zooming function, a plurality of lenses in the lens set 11 may collocate the operation of varying the focal lengths. Meanwhile, the lens driving device in the lens set is necessary to drive the plurality of lenses.

A mechanism for zooming or varying the focal length of a prior two-stage lens is manually controlled but inconvenient. The present invention overcomes this drawback through the use of electromagnetism and reduces the volume of the lens driving device by simplifying the mechanism so as to decrease manufacturing costs and enhance the assembly process. Hence, the miniaturized lens driving device can be applied to photographing modules utilized in mobile phones, laptops, PDAs, etc.

Although U.S. Pat. Nos. 5,150,260, 6,392,827, 5,220,461, and 5,471,100 have disclosed arrangements related to the lens driving device, the present invention is unlike these prior art configurations.

SUMMARY OF INVENTION

The first objective of the present invention is to provide a miniaturized two-stage lens driving device that is simple in structure, saves energy, and uses electromagnetism as a source of power to drive a plurality of lenses in order to effect zooming or vary a focal length. Furthermore, a miniaturized photographing module may be improved in performance.

The second objective of the present invention is to provide a two-stage lens driving device, in which the device comprises at least one coil member and at least one magnetic induction member, and a current is applied to the coil member for producing a magnetic force to drive the magnetic induction member so as to displace a lens holder. The coil member functions to urge the magnetic induction member for positioning while the magnetic induction member is driven.

The third objective of the present invention is to provide a two-stage lens driving device, in which the device comprises a preformed reed of a flake structure made of pliable material and slightly bent at a central portion thereof into a bow shape, two ends of the preformed reed being positioned in the casing, and a central part of the preformed reed being adjacent to an outer surface of the lens holder. The central part of the preformed reed is deformed to produce a thrust since the lens holder is driven to push the central part, and the lens holder remains positioned at a predetermined location due to the thrust after application of a current to a first coil member and a second coil member is stopped in order to save energy.

To achieve the objectives as aforesaid, the two-stage lens driving device of the present invention comprises a lens holder, a guiding mechanism, an electromagnetic actuating mechanism, and a casing, wherein the lens holder carries a lens that defines an axial direction. A guiding mechanism is joined together with the lens holder, and the lens holder is guided by the guiding mechanism for moving linearly along the axial direction. An electromagnetic actuating mechanism comprises at least one magnetic induction member, at least a first coil member, and at least a second coil member. The magnetic induction member is mounted on the lens holder and moved with the lens holder. The first coil member and the second coil member are respectively located at a position corresponding to each of two tail ends of the magnetic induction member. The first coil member, the magnetic induction member, and the second coil member are approximately arranged along a linear direction parallel to the axial direction. A distance between the first coil member and the second coil member is greater than a length of the magnetic induction member along the linear direction. Applying a predetermined current to one of the first coil member and the second coil member produces a magnetic force from one of the coil members for driving the magnetic induction member to move between the first coil member and the second coil member. The first coil member and the second coil member further function to urge and position the magnetic induction member so as to achieve two-stage positioning of driving a lens.

In a preferred embodiment, the two-stage lens driving device further comprises a preformed reed having a flake structure and made of pliable material. The preformed reed is slightly bent at a central portion thereof into a bow shape, and two ends of the preformed reed are positioned in the casing. A central part of the preformed reed is adjacent to an outer surface of the lens holder. The central part of the preformed reed is deformed to produce a thrust since the lens holder is driven to push the central part, and the lens holder is kept positioned at a predetermined location due to the thrust after application of a current to the first coil member and the second coil member is stopped.

BRIEF DESCRIPTION OF THE DRAWINGS

For further understanding the objects, the characteristics, and the functions of the structures of the present invention, a detailed description matched with corresponding drawings are presented as follows.

FIG. 6A and FIG. 6B are schematic operational views of the electromagnetic actuating mechanism using a magnetic induction material such as iron to function as the magnetic induction member of the present invention;

FIG. 7A is an assembled perspective view after dismantling the casing of a second preferred embodiment of the two-stage lens driving device of the present invention in a state where the lens holder is located at a first position;

FIG. 7B is a side view of the two-stage lens driving device of FIG. 7A;

DETAILED DESCRIPTION

Figure 1:
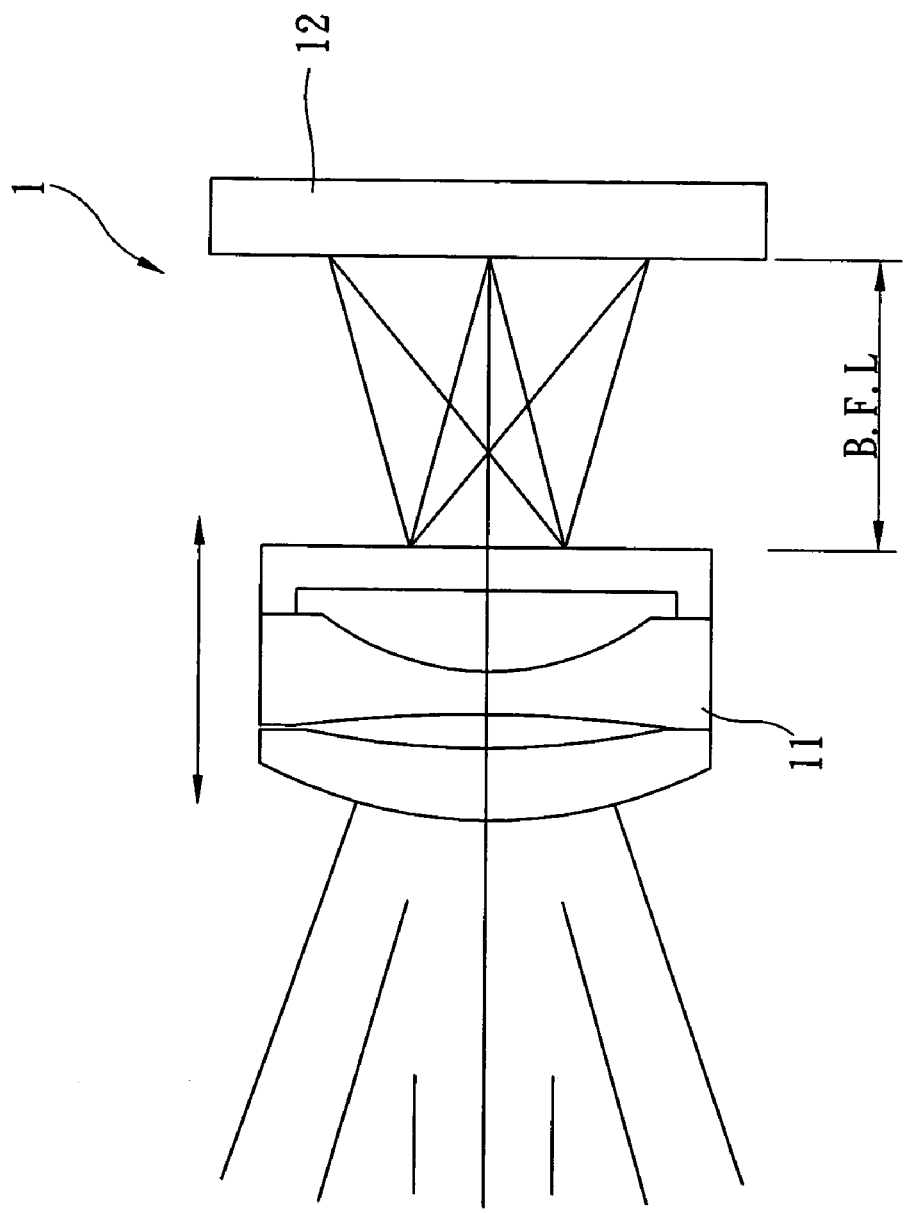
FIG. 1 is a schematic view used to describe a focusing theory in a prior art lens.
Figure 2:
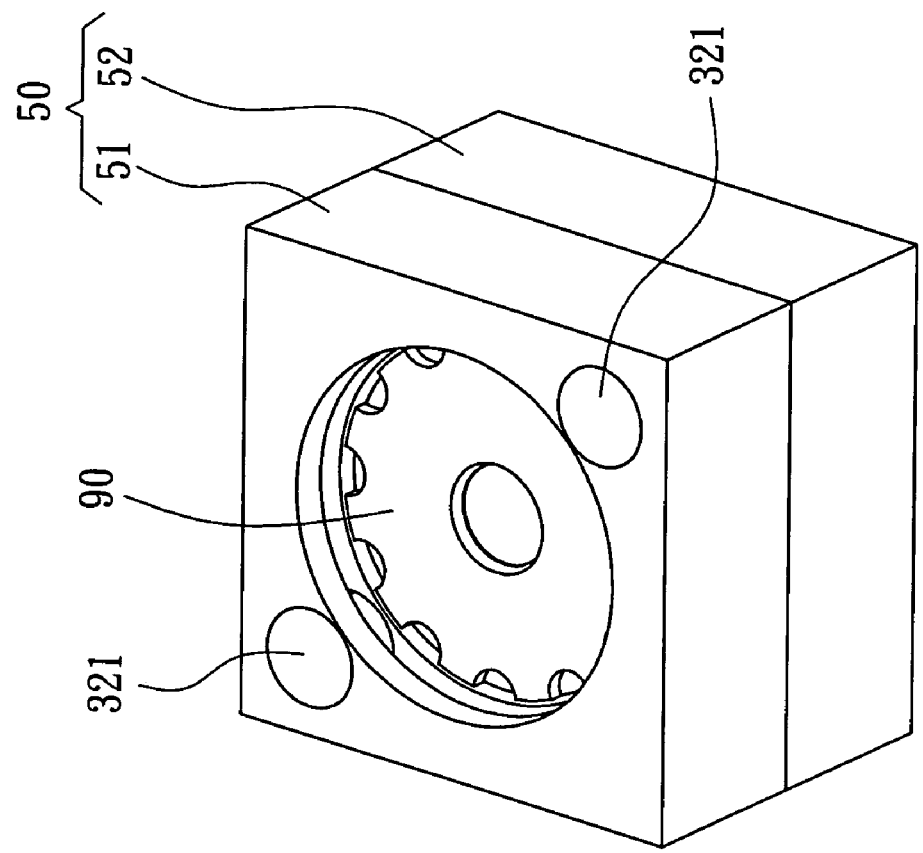
FIG. 2 is an assembled perspective view of a first preferred embodiment of a two-stage lens driving device according to the present invention.
Figure 3:
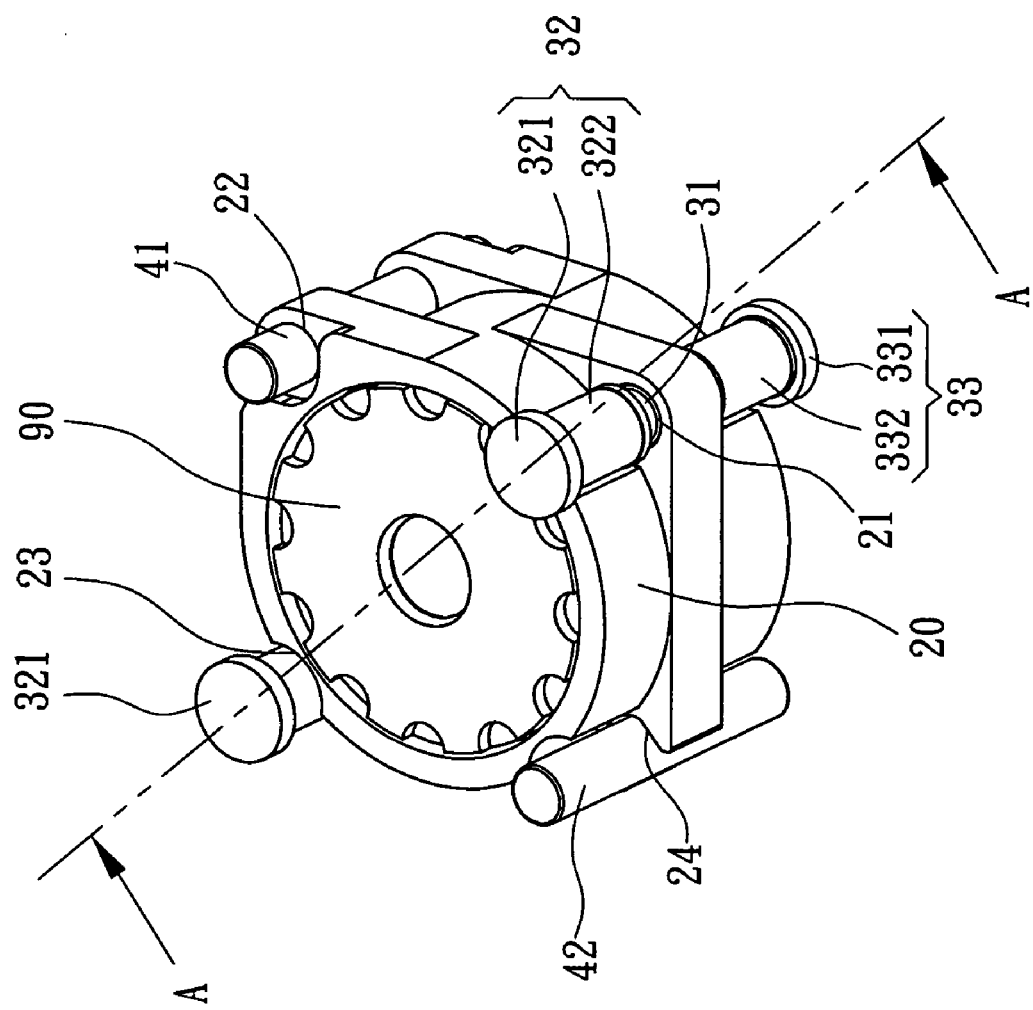
FIG. 3 is an assembled perspective view after dismantling a casing of the first preferred embodiment of the present invention.
Figure 4B:
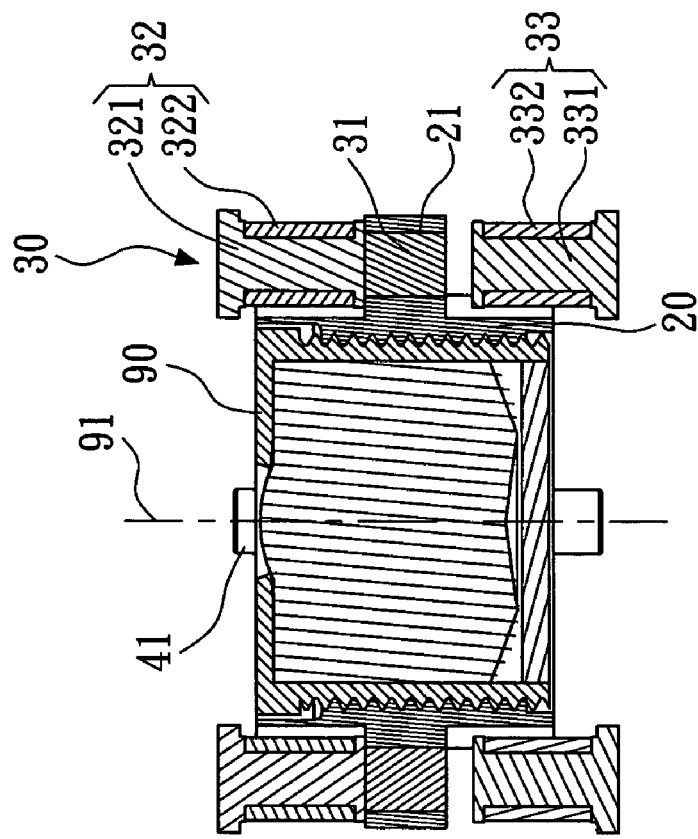
FIG. 4B is a sectional view taken along line A-A of FIG. 3 in a state where the lens holder is located at a second position.

FIG. 2 to FIG. 4B illustrate a first preferred embodiment of the present invention. In particular, FIG. 2 is an assembled perspective view of a first preferred embodiment of a two-stage lens driving device according to the present invention, FIG. 3 is an assembled perspective view after dismantling a casing of the first preferred embodiment of the present invention, FIG. 4A is a sectional view taken along line A-A of FIG. 3 in a state where a lens holder is located at a first position, and FIG. 4B is a sectional view taken along line A-A of FIG. 3 in a state where the lens holder is located at a second position.

As shown in FIG. 2, FIG. 3, FIG. 4A, and FIG. 4B, the two-stage lens driving device comprises: a lens holder 20 for carrying a lens 90, an electromagnetic actuating mechanism 30, a guiding mechanism, and a casing 50.

The lens 90 defines an axial direction 91 as the direction of condensing. In the first preferred embodiment of the present invention, the lens 90 may be a lens module with a single-lens group without the capability of varying a focal length, or may be a lens group in a lens set having the capability of varying a focal length. The lens 90 may be a lens module currently available on the market and is not a characterizing feature of the present invention. Therefore, a description of the lens 90 is not provided hereinafter.

The casing 50 consists of a top cover 51 and a bottom cover 52 that cooperate to form a cavity therebetween. The cavity contains the lens holder 20, the guiding mechanism, and the electromagnetic actuating mechanism 30. Each of a top end and a bottom end of the casing 50 has an opening for the passage of light therethrough. The openings are aligned along the axial direction 91.

The lens holder 20 is formed having a hollow socket structure and has an outer surface. In the preferred embodiment, the lens holder 20 projects an image along the axial direction 91, in which the image is shaped approximately as a square. A center of the lens holder 20 is formed with an axial through hole (not indicated by a reference numeral). Two thread structures (not indicated by a reference numeral) corresponding to each other are respectively formed on the axial through hole and the lens 90 so as allow the lens 90 to be screwed into the axial through hole of the lens holder 20.

As shown in FIG. 2 and FIG. 3, the guiding mechanism is joined together with the lens holder 20. The lens holder 20 is guided by the guiding mechanism for moving linearly along the axial direction 91. The guiding mechanism comprises at least one guiding hole 22 or at least one guiding slot 24 on the lens holder 20 and at least one guiding rod 41 or 42 parallel to the axial direction 91. The guiding rods 41 and 42 are respectively mounted in the casing 50 and are movable in the guiding hole 22 or the guiding slot 24 so as to let the lens holder 20 be guided by the guiding rods 41 and 42 to move along an extension direction of the guiding rods 41 and 42, the extension direction being the same as the axial direction 91.

The electromagnetic actuating mechanism 30 comprises at least one magnetic induction member 31, at least a first coil member 32, and at least a second coil member 33. With reference to FIG. 2 to FIG. 4B, which illustrate the first preferred embodiment of the present invention, two sides of the lens holder 20 have respectively an assembly of the magnetic induction member 31, the first coil member 32, and the second coil member 33. The first and second coil members 32,33 comprise at least one magnetic induction column 321, 331 and at least one coil 322,332 surrounding the magnetic induction column 321,331. By applying a predetermined current (direct current) to the coil 322,332, a predetermined magnetic force is produced at an end of the magnetic induction column 321,331 adjacent to the magnetic induction member 31. In addition, ends of each of the magnetic induction columns 321 and 331 adjacent to the casing 50 are respectively formed with bases (not indicated by a reference numeral) with larger diameters than the remainder of the magnetic induction columns 321,331 so as to embed in a plurality of thread holes on the casing 50. An indent 23 is formed at a location on the lens holder 20 adjacent to the first coil member 32 and the second coil member 33 so as to form a gap between the lens holder 20 and the coil members 32 and 33. Relative motion can then occur between the lens holder 20 and the coil members 32 and 33.

Figure 4A:
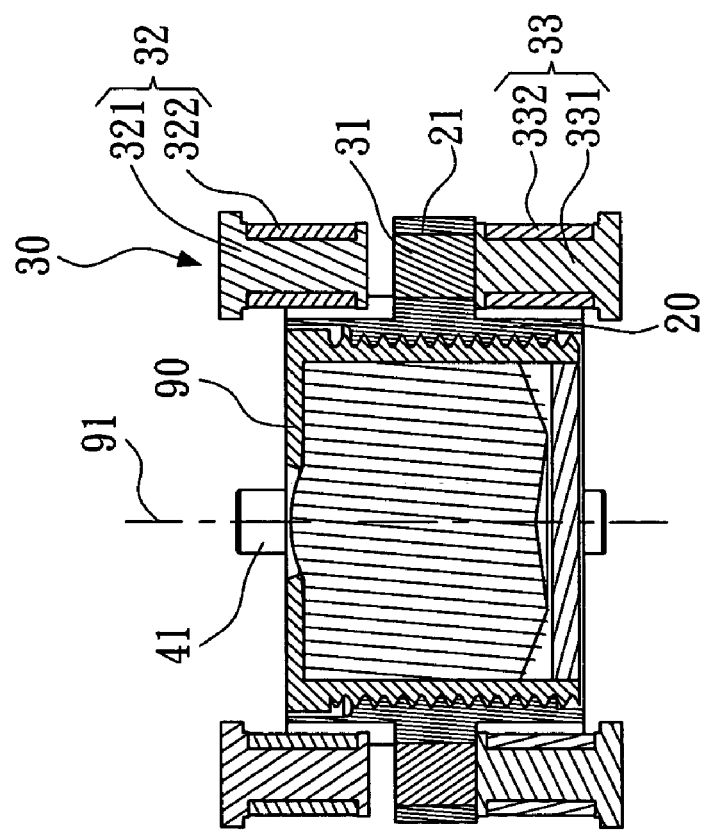
FIG. 4A is a sectional view taken along line A-A of FIG. 3 in a state where a lens holder is located at a first position.

As shown in FIG. 4A and FIG. 4B, the magnetic induction material 31 is mounted in a through hole 21 of the lens holder 20 in order to let the magnetic induction material 31 and the lens holder 20 move together. The first coil member 32 and the second coil member 33 are respectively located at a position corresponding to each of two tail ends of the magnetic induction member 31 along the axial direction 91. The first coil member 32, the magnetic induction member 31, and the second coil member 33 are approximately arranged along a linear direction parallel to the axial direction 91. A distance between the first coil member 32 and the second coil member 33 is greater than a length of the magnetic induction member 31 along the linear direction. As a result, the magnetic induction member 31 is capable of moving along the axial direction 91 between the first coil member 32 and the second coil member 33. By applying a predetermined current to one of the coils 322,332 of the coil members 32,33, a predetermined magnetic force is produced at an end of the magnetic induction column 321,331 of the coil members 32,33 so as to let the magnetic induction member 31 move between the first coil member 32 and the second coil member 33. Furthermore, the first coil member 32 and the second coil member 33 function to urge and position the magnetic induction member 31 so as to achieve two-stage positioning of driving a lens. As shown in FIG. 4A, while the magnetic induction member 31 with the lens holder 20 is pushed (or attracted) to move downward, a top end of the magnetic induction column 331 of the second coil member 33 may urge the magnetic induction member 31 with the lens holder 20 for positioning. With reference to FIG. 4B, while the magnetic induction member 31 with the lens holder 20 is pushed (or attracted) to move upward, a bottom end of the magnetic induction column 321 of the first coil member 32 may urge the magnetic induction member 31 with the lens holder 20 for positioning.

Figure 5B:
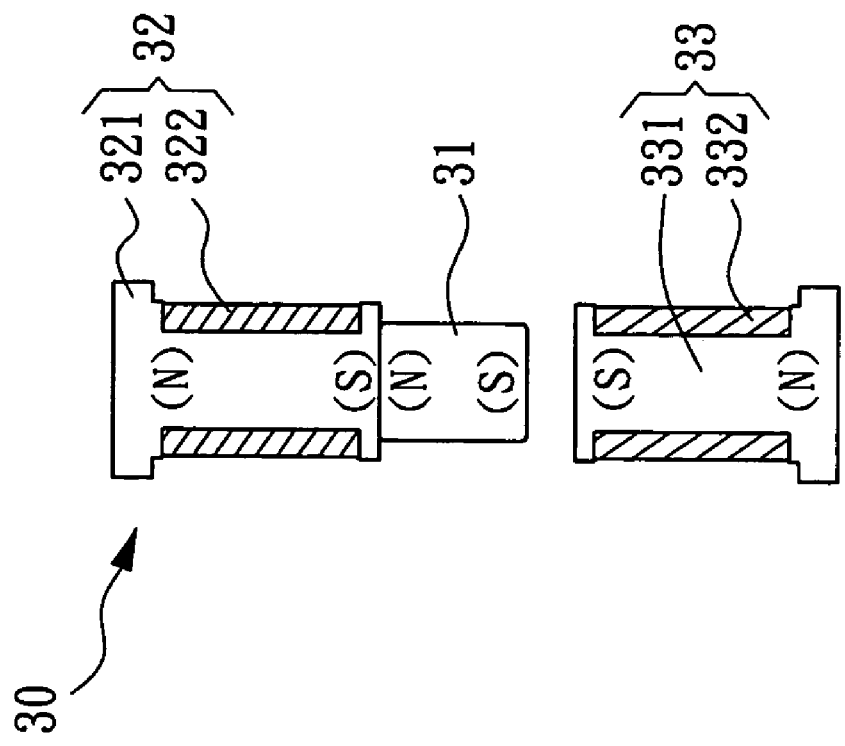
FIG. 5A and FIG. 5B are schematic operational views of an electromagnetic actuating mechanism using a permanent magnet to function as a magnetic induction member of the present invention.
Figure 5A:
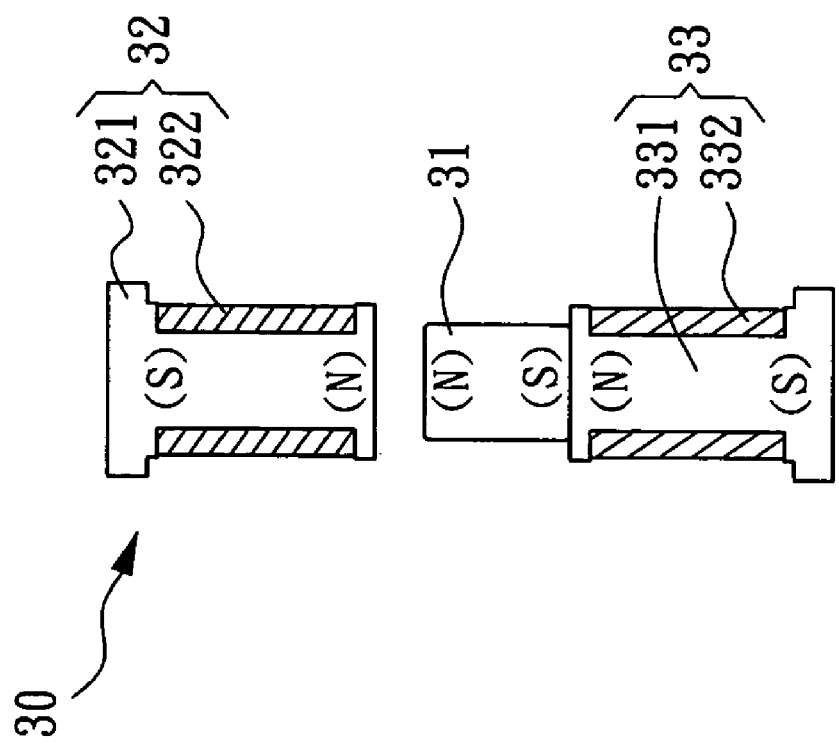

In the present invention, the magnetic induction member 31 is a permanent magnet or a magnetizer such as a yoke, etc. As shown in FIG. 5A and FIG. 5B, which are schematic operational views of the electromagnetic actuating mechanism 30 using a permanent magnet to function as the magnetic induction member 31 of the present invention, two ends of the permanent magnet (the magnetic induction member 31) have two opposite poles, a N-pole and a S-pole, comparing with two ends of the first coil member 32 and the second coil member 33. Referring to FIG. 5B, by applying two different directions of current to the first coil member 32 and the second coil member 33 so as to produce a S-pole magnetic force at a bottom of the first coil member 32 and a S-pole magnetic force at a top of the second coil member 33, the permanent magnet may be urged to the bottom of the first coil member 32. Referring to FIG. 5A, by reversing the current directions of the first coil member 32 and the second coil member 33, the permanent magnet 31 is urged to the top of the second coil member 33. FIG. 6A and FIG. 6B are schematic operational views of the electromagnetic actuating mechanism 30A using a magnetic induction material such as iron to function as the magnetic induction member 39 of the present invention. Referring to FIG. 6B, by applying a current in any direction to the coil 322a of the first coil member 32a so as to produce a magnetic force at a bottom of the magnetic induction column 321a of the first coil member 32a, the magnetic induction member 39 is attracted to the bottom of the first coil member 32a. Referring to FIG. 6A, by applying a current in any direction to the coil 332a of the second coil member 33a, the magnetic induction member 39 is attracted to the top of the magnetic induction column 331a of the second coil member 33a.

Figures 8A, 8B:
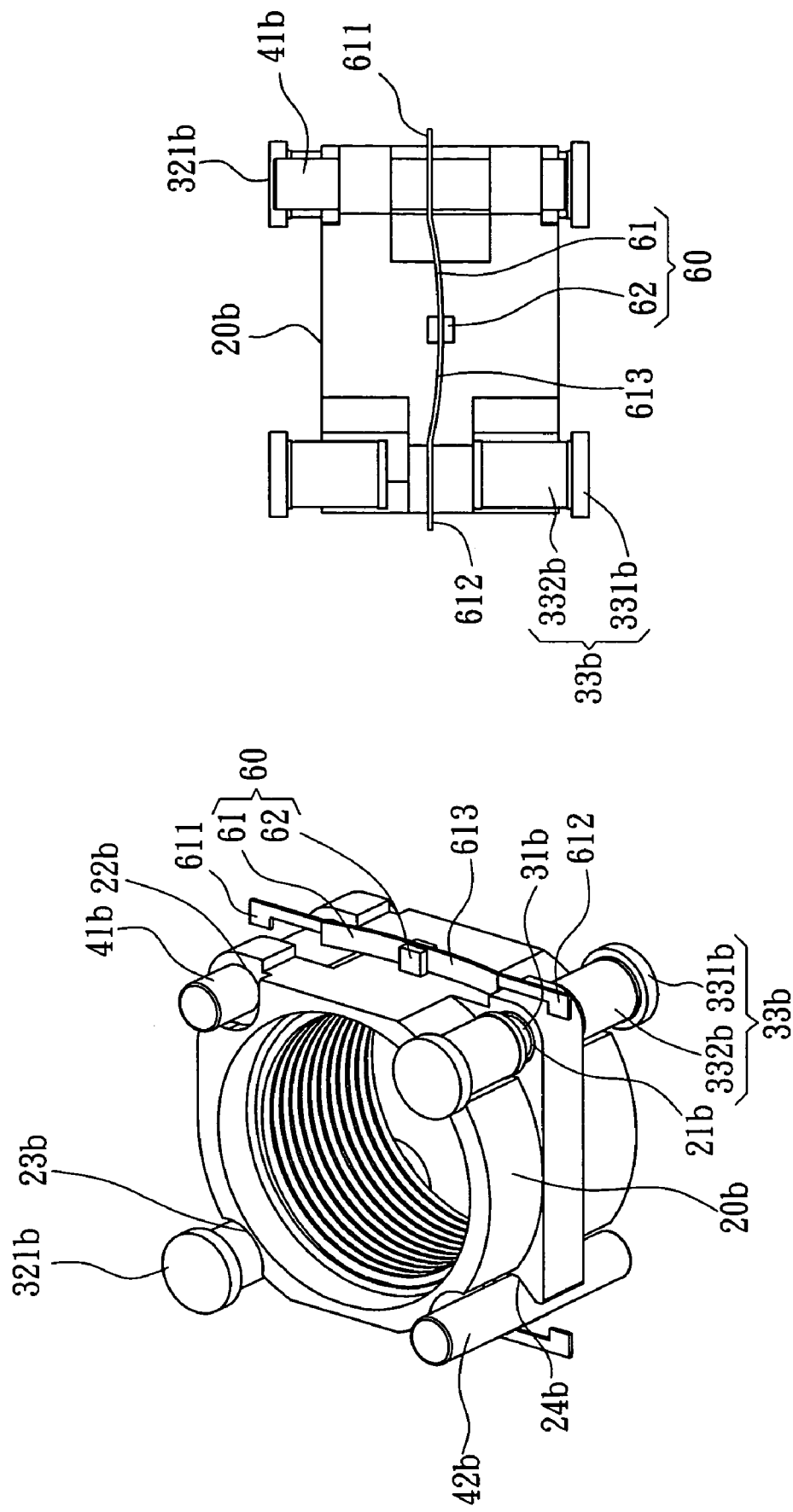
FIG. 8A is an assembled perspective view after dismantling the casing of the second preferred embodiment of the two-stage lens driving device of the present invention in a state where the lens holder is located at a second position.
FIG. 8B is a side view of the two-stage lens driving device of FIG. 8A.

FIG. 7A, FIG. 7B, FIG. 8A, and FIG. 8B illustrate a second preferred embodiment of the two-stage lens driving device of the present invention. In particular, FIG. 7A is an assembled perspective view after dismantling the casing of a second preferred embodiment of the two-stage lens driving device of the present invention in a state where the lens holder is located at a first position, FIG. 7B is a side view of the two-stage lens driving device of FIG. 7A, FIG. 8A is an assembled perspective view after dismantling the casing of the second preferred embodiment of the two-stage lens driving device of the present invention in a state where the lens holder is located at a second position, and FIG. 8B is a side view of the two-stage lens driving device of FIG. 8A.

With reference to FIG. 7A, FIG. 7B, FIG. 8A, and FIG. 8B, the second preferred embodiment of the two-stage lens driving device of the present invention also comprises the lens holder 20b, the electromagnetic actuating mechanism 30b, the guiding mechanism, and the casing (not shown). The lens holder 20b, the electromagnetic actuating mechanism 30b, the guiding mechanism, and the casing of the second preferred embodiment are similar to the first preferred embodiment, and hence, are not described hereinafter. The second preferred embodiment differs from the first preferred embodiment in that a positioning mechanism 60 is added to the structure. The positioning mechanism 60 comprises a preformed reed 61 and a positioning clip 62. The preformed reed 61 has a flake structure made of pliable material and is slightly bent at a central portion thereof into a bow shape. Two ends 611, 612 of the preformed reed 61 are positioned in the casing, and a central part 613 of the preformed reed 61 is adjacent to an outer surface of the lens holder 20b. With reference to FIG. 7A and FIG. 8A, the positioning clip 62 is disposed on the lens holder 20b adjacent to the central part 613 of the preformed reed 61. The preformed reed 61 is disposed along a direction perpendicular to the axial direction 90, that is, the preformed reed 61 is approximately horizontal. The positioning clip 62 holds the central part 613 of the preformed reed 61. The central part 613 of the preformed reed 61 is deformed to produce a thrust since the lens holder 20b is driven to push the central part 613, and the lens holder 20b is maintained positioned at a predetermined location due to the thrust after application of a current to the first coil member 32b and the second coil member 33b is stopped so as to save energy. For instance, the lens holder 20b is kept at the top due to the special structure of the preformed reed 61, as shown in FIG. 7B, or the lens holder 20b is kept at the bottom, as shown in FIG. 8B.

Figure 9A:
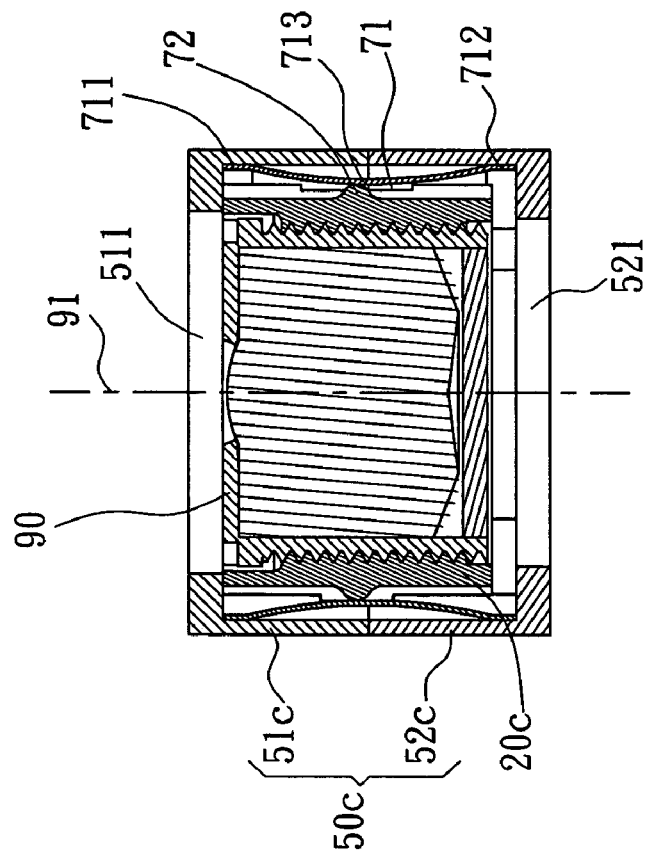
FIG. 9A and FIG. 9B are sectional views of a third preferred embodiment of the two-stage lens driving device of the present invention.
Figure 9B:
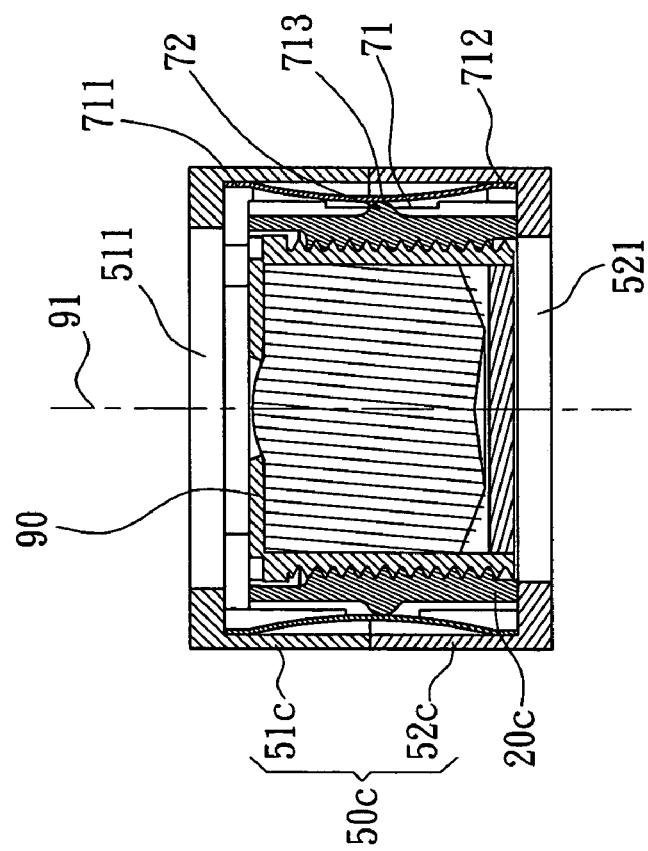

FIG. 9A and FIG. 9B show a third preferred embodiment of the two-stage lens driving device of the present invention. The third preferred embodiment differs from the second preferred embodiment in that a protruding point 72 is further provided on the lens holder 20c adjacent to the central part 713 of the preformed reed 71. The preformed reed 71 is disposed along a direction parallel to the axial direction 91, and two tail ends 711, 712 respectively urge corners of two inner rims of the top cover 51c and the bottom cover 52c. Also, the protruding point 72 slightly depresses the central part 713 of the preformed reed 71. The central part 713 of the preformed reed 71 is deformed to produce a thrust since the lens holder 20c is driven to let the protruding point 72 push the central part 713, and the lens holder 20c is maintained positioned at a predetermined location due to the thrust after application of a current to the first coil member and the second coil member (not shown) is stopped so as to save energy. For instance, the lens holder 20c is kept at the top due to the special structure of the preformed reed 71, as shown in FIG. 9B, or the lens holder 20b is kept at the bottom, as shown in FIG. 9A. Each of a top end and a bottom end of the casing 50 along the axial direction 91 is formed with an opening 511,521 for allowing the passage of light therethrough.

While the invention has been described by way of examples and in terms of the preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A two-stage lens driving device, comprising:
   a lens holder for carrying a lens, the lens defining an axial direction;
   a guiding mechanism joined together with the lens holder, the lens holder being guided by the guiding mechanism for moving linearly along the axial direction; and
   an electromagnetic actuating mechanism having at least one magnetic induction member, at least a first coil member, and at least a second coil member, the magnetic induction member being mounted on the lens holder and moved with the lens holder, the first coil member and the second coil member being respectively located at a position corresponding to each of two tail ends of the magnetic induction member, the first coil member, the magnetic induction member, and the second coil member being arranged substantially along a linear direction parallel to the axial direction, a distance between the first coil member and the second coil member being greater than a length of the magnetic induction member along the linear direction;
   wherein applying a predetermined current to one of the first coil member and the second coil member produces a magnetic force from one of the coil members for driving the magnetic induction member to move between the first coil member and the second coil member, the first coil member and the second coil member further function to urge and position the magnetic induction member so as to achieve two-stage positioning of driving a lens.

2. The two-stage lens driving device according to claim 1 further comprising a hollow casing for containing the lens holder, the guiding mechanism, and the electromagnetic actuating mechanism, each of two ends of the casing being formed with an opening along the axial direction for light going through.

3. The two-stage lens driving device according to claim 2, wherein the guiding mechanism comprises at least one guiding hole on the lens holder and at least one guiding rod parallel to the axial direction, the guiding rod is mounted in the casing and movable in the guiding hole so as to let the lens holder be guided by the guiding rod to move along an extension direction of the guiding rod.

4. The two-stage lens driving device according to claim 2 further comprising:
   a preformed reed having a flake structure and being made of pliable material, the preformed reed being slightly bent at a central portion thereof into a bow shape, two ends of the preformed reed being positioned in the casing, a central part of the preformed reed being adjacent to an outer surface of the lens holder;
   wherein the central part of the preformed reed is deformed to produce a thrust since the lens holder is driven to push the central part, and the lens holder is kept remaining positioned at a predetermined location due to the thrust after application of a current to the first coil member and the second coil member is stopped.

5. The two-stage lens driving device according to claim 4, wherein a positioning clip is further on the lens holder adjacent to the central part of the preformed reed, the preformed reed is set along the axial direction, the positioning clip holds the central part of the preformed reed.

6. The two-stage lens driving device according to claim 4, wherein a protruding point is further formed on the lens holder adjacent to the central part of the preformed reed, the preformed reed is set along the axial direction, the protruding point slightly depresses the central part of the preformed reed.

7. The two-stage lens driving device according to claim 1, wherein the first coil member and the second coil member comprise respectively a magnetic induction column and at least one coil wound on the magnetic induction column, a predetermined magnetic force is produced at an end of the magnetic induction column where adjacent to the magnetic induction member by applying a predetermined current to the coils.

8. The two-stage lens driving device according to claim 1, wherein the magnetic induction member is a permanent magnet, and two ends of the permanent magnet have two opposite poles corresponding to two ends of the first coil member and the second coil member.

9. The two-stage lens driving device according to claim 1, wherein the magnetic induction member is made of magnetic induction material.

10. The two-stage lens driving device according to claim 9, wherein the magnetic induction material is iron.

11. A two-stage lens driving device, comprising:
   a casing having a cavity therein;
   a lens holder disposed in the casing and defining an axial direction;
   a guiding mechanism disposed in the casing and being joined together with the lens holder, the lens holder being guided by the guiding mechanism for moving linearly along the axial direction;
   an electromagnetic actuating mechanism having at least one coil member and at least one magnetic induction member, the coil member being relatively located to the magnetic induction member, wherein one of the coil member and the magnetic induction member is disposed on the lens holder, and another is disposed on the casing, applying a current with a predetermined direction to the coil member produces a predetermined magnetic force between the coil member and the magnetic induction member for driving the lens holder; and
   a preformed reed having a flake structure and made of pliable material, the preformed reed being slightly bent at a central portion thereof into a bow shape, two ends of the preformed reed being positioned in the casing, a central part of the preformed reed being adjacent to an outer surface of the lens holder;
   wherein the central part of the preformed reed is deformed to produce a thrust since the lens holder is driven to push the central part, and the lens holder is kept remained positioned at a predetermined location due to the thrust after application of a current to the coil member is stopped.

12. The two-stage lens driving device according to claim 11, wherein a positioning clip is further on the lens holder adjacent to the central part of the preformed reed, the preformed reed is set along the axial direction, the positioning clip holds the central part of the preformed reed.

13. The two-stage lens driving device according to claim 11, wherein a protruding point is further formed on the lens holder adjacent to the central part of the preformed reed, the preformed reed is set along the axial direction, the protruding point slightly depresses the central part of the preformed reed.

14. The two-stage lens driving device according to claim 11, wherein the guiding mechanism comprises at least one guiding hole on the lens holder and at least one guiding rod parallel to the axial direction, the guiding rod is mounted in the casing and movable in the guiding hole so as to let the lens holder be guided by the guiding rod to move along an extension direction of the guiding rod.

15. The two-stage lens driving device according to claim 11, wherein the coil member comprises: at least a first coil member and at least a second coil member, the magnetic induction member is mounted on the lens holder and moved with the lens holder, the first coil member and the second coil member are respectively located at a position corresponding to each of two tail ends of the magnetic induction member, the first coil member, the magnetic induction member, and the second coil member are arranged substantially along a linear direction parallel to the axial direction, a distance between the first coil member and the second coil member is greater than a length of the magnetic induction member along the linear direction;
   wherein applying a predetermined current to at least one of the first coil member and the second coil member produces a magnetic force from one of the coil members for driving the magnetic induction member to move between the first coil member and the second coil member, the first coil member and the second coil member further function to urge and position the magnetic induction member so as to achieve two-stage positioning of driving a lens.

16. The two-stage lens driving device according to claim 15, wherein the first coil member and the second coil member comprise respectively a magnetic induction column and at least one coil wound on the magnetic induction column, a predetermined magnetic force is produced at an end of the magnetic induction column where adjacent to the magnetic induction member by applying a predetermined current to the coils.

17. The two-stage lens driving device according to claim 15, wherein the magnetic induction member is a permanent magnet, and two ends of the permanent magnet have two opposite poles corresponding to two ends of the first coil member and the second coil member.

18. The two-stage lens driving device according to claim 15, wherein the magnetic induction member is made of magnetic induction material.

19. The two-stage lens driving device according to claim 18, wherein the magnetic induction material is iron.

* * * * *